(12) United States Patent
Poral et al.

(10) Patent No.: US 10,210,906 B2
(45) Date of Patent: Feb. 19, 2019

(54) CONTENT PLAYBACK AND RECORDING BASED ON SCENE CHANGE DETECTION AND METADATA

(71) Applicant: ARRIS Enterprises LLC, Suwanee, GA (US)

(72) Inventors: Jeethendra Poral, Bangalore (IN); Virendra Singh, Bangalore (IN); Murali S. Sahasranaman, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 191 days.

(21) Appl. No.: 15/175,684

(22) Filed: Jun. 7, 2016

(65) Prior Publication Data

US 2016/0358633 A1 Dec. 8, 2016

Related U.S. Application Data

(60) Provisional application No. 62/172,397, filed on Jun. 8, 2015.

(51) Int. Cl.
*G11B 27/034* (2006.01)
*G11B 27/19* (2006.01)
*G11B 27/34* (2006.01)
*H04N 5/765* (2006.01)
*H04N 5/91* (2006.01)
*H04N 5/93* (2006.01)
*H04N 9/82* (2006.01)

(52) U.S. Cl.
CPC ............ *G11B 27/19* (2013.01); *G11B 27/034* (2013.01); *G11B 27/34* (2013.01); *H04N 5/765* (2013.01); *H04N 5/91* (2013.01); *H04N 5/93* (2013.01); *H04N 9/8205* (2013.01)

(58) Field of Classification Search
None
See application file for complete search history.

(56) References Cited

U.S. PATENT DOCUMENTS

2009/0064267 A1* 3/2009 Lee ...................... H04N 21/235
725/149
2010/0027963 A1* 2/2010 Shiitani ................ G11B 27/105
386/241

* cited by examiner

*Primary Examiner* — Eileen M Adams
(74) *Attorney, Agent, or Firm* — Bart A. Perkins

(57) ABSTRACT

Methods, systems, and computer readable media described herein may facilitate the characterization of content segments based on a type of content, thus providing a user with the flexibility to: record only the scene types of interest to the user; playback only the scene types of interest to the user; search a media library, wherein the results of the search will include a list of only the content having scene types of interest to the user; browse available user selected scenes from clients; reposition content to user interested scene type during playback; and/or generate a detailed listing of the content based on the scene types. Scene change detection and scene type metadata may be used to identify scene boundaries within a piece of content and to characterize a scene based on a scene type.

20 Claims, 8 Drawing Sheets

CONTENT PLAYBACK AND RECORDING BASED ON SCENE CHANGE DETECTION AND METADATA

CROSS REFERENCE TO RELATED APPLICATION

This application is a non-provisional application claiming the benefit of U.S. Provisional Application Ser. No. 62/172,397, entitled "Recording, Playback and Searching of Content Based upon Scene Type," which was filed on Jun. 8, 2015, and is incorporated herein by reference in its entirety.

TECHNICAL FIELD

This disclosure relates to playback and recording based upon scene change detection and scene metadata.

BACKGROUND

Recording capabilities of in-home devices such as a digital video recorder (DVR) have resulted in the storage of entire programs which are typically thirty minute or sixty minute segments, but some recorded programming may be several hours in length (e.g., movies, live events, sporting events, etc.). Current DVR interfaces require that the entirety of a program be recorded and stored at the DVR device. Thus, DVR storage capacity may quickly become scarce when several full-length pieces of content are recorded, and a user may be prevented from recording other programs of interest.

In some instances, a user might only be interested in one or more segments of a program (e.g., highlights, favorite scenes, etc.), and the user might desire that these one or more segments be permanently, or for at least an extended period of time, saved at a DVR device. The one or more segments may be only a fraction of the total length of the associated program. Moreover, using current DVR interfaces, playback of desired content segments is hampered as it requires searching through the rest of the piece of content using trickplay functions (e.g., fast-forward, rewind, skip, etc.) to get to the right location within the content.

With currently deployed DVR and set-top box (STB) technology, in order for a user to record a short video segment, the consumer typically has to be next to the DVR device or STB during a live transmission (or retransmission, if offered) and needs to press 'Record' and 'Stop' buttons located on the DVR device or STB precisely at the targeted start and stop points of the desired video segment. Besides the issue of requiring the user to be present to manually perform the recording, the user is further expected to have prior knowledge that an upcoming segment of the live content is going to be a segment that the user will want saved as an individual segment, which is problematic during a first viewing of the content.

Currently, customer premise equipment (CPE) devices do not offer a user the option to record specific types of scenes within a piece of content (e.g., television show, movie, etc.). For example, a user might be interested in only the action scenes of a piece of content. Currently, during consumption of recorded content, a user is unable to playback or reposition the content to only the scene types of interest. For example, in order to view scenes of interest, the user may have to start the playback of a recorded piece of content and perform trick play or repositioning to reach the scenes of interest. Further, the user cannot search a piece of content from a media library based on a type of scene of interest.

Moreover, a user does not have the option to search through scenes of the content or to categorize content portions based on scene type. Therefore, a need exists for methods and systems operable to provide a user with insight into the scene-type makeup of a piece of content.

BRIEF DESCRIPTION OF THE DRAWINGS

Like reference numbers and designations in the various drawings indicate like elements.

DETAILED DESCRIPTION

Figure 1:
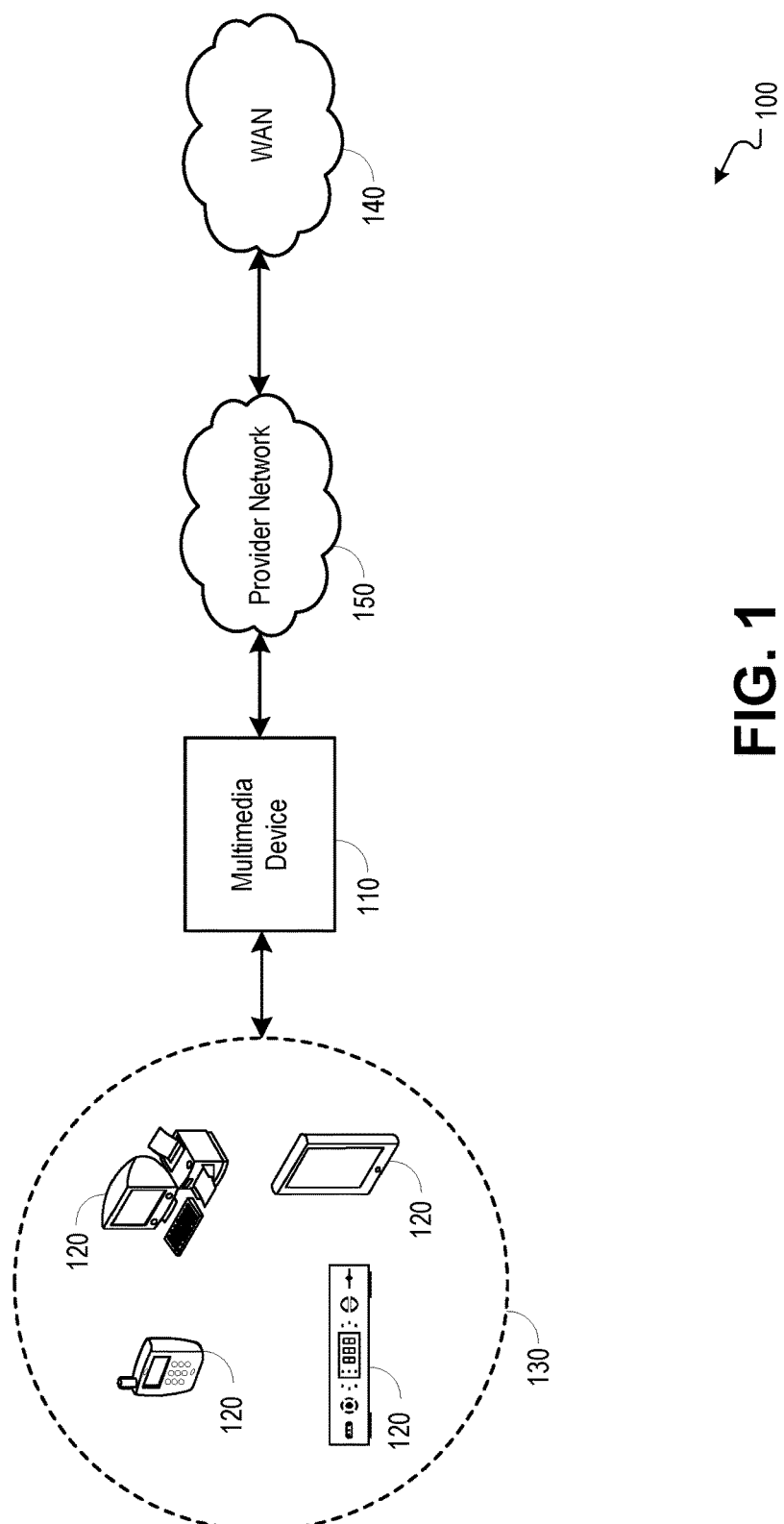
FIG. 1 is a block diagram illustrating an example network environment operable to facilitate the user control of content based on scene change detection and metadata.

As a preliminary matter, it readily will be understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The disclosure is not intended nor is to be construed to limit the present invention or otherwise to exclude any such other embodiments, adaptations, variations, modifications and equivalent arrangements, the present invention being limited only by the claims appended hereto and the equivalents thereof.

It is desirable to provide methods and systems operable to provide a user with insight into the scene-type makeup of a piece of content. Methods, systems, and computer readable media described herein may facilitate the characterization of content segments based on a type of content, thus providing a user with the flexibility to: record only the scene types of interest to the user (e.g., comedy, action, romance, etc.);

playback only the scene types of interest to the user; search a media library, wherein the results of the search will include a list of only the content having scene types of interest to the user; browse all available user selected scenes from clients; reposition content to user interested scene type during playback; and/or generate a detailed listing of the content based on the scene types.

Scene type detection may be used to identify scene boundaries within a piece of content, and may further be used to characterize a scene based on a scene type (e.g., comedy, action, romance, etc.). It should be understood that various scene change detection methods may be used. A system on chip (SoC) may provide a means to enable hardware scene change detection during playback or recording of content. In embodiments, a content provider may add the scene types (e.g., action scene, comedy scene, romance scene, drama scene, etc.) along with other scene information in the beginning of each scene. Scene metadata created on a per content basis may include the starting frame offset of each scene along with the duration and type of the scene. Scene metadata may aide in recording, playing back or jumping to a requested type of scene when the request is triggered.

It should be understood that the methods, systems, and computer readable media described herein may work equally well with either in-home DVR or with network-based DVR (e.g., nDVR). Network DVR (nDVR) storage has the benefit of keeping these archived video segments in the cloud. In-home DVR may be supplemented with nDVR, thereby allowing these personalized archived video segments to be moved to cloud storage. This enables permanent storage, even if the in-home DVR is replaced.

The methods, systems and computer readable media described herein further provide the flexibility for a user to record only the scenes of interest within a program. This may enhance user experience during playback as the user need not perform any navigation to reach a favorite scene and may also help in saving the DVR disk space by not recording the scenes which are not of interest to a user.

An embodiment of the invention described herein may include a method comprising: (a) receiving a request to record a piece of content, wherein the request identifies a specified scene type for recording; (b) retrieving the piece of content; (c) retrieving scene type information associated with the piece of content, wherein the scene type information identifies a scene type associated with each respective one of one or more segments of the piece of content, each respective segment comprising a start point at a scene boundary and an end point at another scene boundary; (d) based upon the scene type information associated with the piece of content, identifying one or more segments of the piece of content that are associated with the specified scene type; and (e) recording and storing the identified one or more segments of the piece of content.

According to an embodiment of the invention, the scene type information is retrieved from metadata carried within the piece of content.

According to an embodiment of the invention, the identified one or more segments of the piece of content are the only segments of the piece of content that are recorded.

According to an embodiment of the invention, the method described herein further comprises: (a) wherein the entirety of the piece of content is recorded; (b) identifying a scene type associated with each of one or more segments of the piece of content, each respective segment comprising a start point at a scene boundary and an end point at another scene boundary; (c) generating a user interface including an identification of each scene type that is associated with at least one segment of the piece of content; and (d) outputting the user interface to a display.

According to an embodiment of the invention, the method described herein further comprises: (a) receiving a request for playback of one or more segments associated with a specified scene type; and (b) initiating playback of the one or more segments that are associated with the specified scene type.

According to an embodiment of the invention, the method described herein further comprises: (a) wherein one or more segments of another piece of content are recorded and stored, the one or more segments being associated with the specified scene type; (b) receiving a request to display the one or more scenes of the specified scene type for each of the pieces of content recorded and stored; (c) for each piece of content that is recorded and stored, identifying each segment that is associated with the specified scene type; (d) generating a user interface including an identification of each of the segments identified from each of the pieces of content; and (e) outputting the user interface to a display.

According to an embodiment of the invention, the method described herein further comprises: (a) receiving a request for playback of one or more of the segments; and (b) initiating playback of the one or more segments.

An embodiment of the invention described herein may include an apparatus comprising: (a) one or more interfaces configured to be used to: (i) receive a request to record a piece of content, wherein the request identifies a specified scene type for recording; and (ii) retrieve the piece of content; and (b) a scene type recording module configured to: (i) retrieve scene type information associated with the piece of content, wherein the scene type information identifies a scene type associated with each respective one of one or more segments of the piece of content, each respective segment comprising a start point at a scene boundary and an end point at another scene boundary; (ii) based upon the scene type information associated with the piece of content, identify one or more segments of the piece of content that are associated with the specified scene type; and (iii) record and store the identified one or more segments of the piece of content.

According to an embodiment of the invention, the entirety of the piece of content is recorded, and the apparatus described herein further comprises: (a) a scene type module configured to: (i) identify a scene type associated with each of one or more segments of the piece of content, each respective segment comprising a start point at a scene boundary and an end point at another scene boundary; and (ii) generate a user interface including an identification of each scene type that is associated with at least one segment of the piece of content; and (b) wherein the one or more interfaces are further configured to be used to output the user interface to a display.

According to an embodiment of the invention, the one or more interfaces are further configured to be used to receive a request for playback of one or more segments associated with a specified scene type, and the scene type module is further configured to initiate playback of the one or more segments that are associated with the specified scene type.

According to an embodiment of the invention, one or more segments of another piece of content are recorded and stored, the one or more segments being associated with the specified scene type, the one or more interfaces are further configured to be used to receive a request to display the one or more scenes of the specified scene type for each of the pieces of content recorded and stored, and the apparatus further comprises: (a) a scene type module configured to: (i) for each piece of content that is recorded and stored, identify each segment that is associated with the specified scene type; and (ii) generate a user interface including an identification of each of the segments identified from each of the pieces of content; and (b) wherein the one or more interfaces are further configured to be used to output the user interface to a display.

An embodiment of the invention described herein may include one or more non-transitory computer readable media having instructions operable to cause one or more processors to perform the operations comprising: (a) receiving a request to record a piece of content, wherein the request identifies a specified scene type for recording; (b) retrieving the piece of content; (c) retrieving scene type information associated with the piece of content, wherein the scene type information identifies a scene type associated with each respective one of one or more segments of the piece of content, each respective segment comprising a start point at a scene boundary and an end point at another scene boundary; (d) based upon the scene type information associated with the piece of content, identifying one or more segments of the piece of content that are associated with the specified scene type; and (e) recording and storing the identified one or more segments of the piece of content.

According to an embodiment of the invention, the instructions are further operable to cause the one or more processors to perform the operations comprising: (a) wherein the entirety of the piece of content is recorded; (b) identifying a scene type associated with each of one or more segments of the piece of content, each respective segment comprising a start point at a scene boundary and an end point at another scene boundary; (c) generating a user interface including an identification of each scene type that is associated with at least one segment of the piece of content; and (d) outputting the user interface to a display.

According to an embodiment of the invention, the instructions are further operable to cause the one or more processors to perform the operations comprising: (a) receiving a request for playback of one or more segments associated with a specified scene type; and (b) initiating playback of the one or more segments that are associated with the specified scene type.

According to an embodiment of the invention, the instructions are further operable to cause the one or more processors to perform the operations comprising: (a) wherein one or more segments of another piece of content are recorded and stored, the one or more segments being associated with the specified scene type; (b) receiving a request to display the one or more scenes of the specified scene type for each of the pieces of content recorded and stored; (c) for each piece of content that is recorded and stored, identifying each segment that is associated with the specified scene type; (d) generating a user interface including an identification of each of the segments identified from each of the pieces of content; and (e) outputting the user interface to a display.

According to an embodiment of the invention, the instructions are further operable to cause the one or more processors to perform the operations comprising: (a) receiving a request for playback of one or more of the segments; and (b) initiating playback of the one or more segments.

FIG. 1 is a block diagram illustrating an example network environment 100 operable to facilitate the user control of content based on scene change detection and metadata. In embodiments, a multimedia device 110 may be configured to provide multimedia services to one or more client devices 120. The multimedia device 110 may include a multimedia or residential gateway, a set-top box (STB), or any other device configured to receive, store, and/or deliver multimedia content to one or more client devices 120. Client devices 120 may include televisions, computers, tablets, mobile devices, STBs, game consoles, and any other device configured to receive a multimedia service.

In embodiments, multimedia content may be delivered from a multimedia device 110 to one or more client devices 120 over a local network 130 (e.g., a local area network (LAN), a wireless local area network (WLAN), a personal area network (PAN), etc.). The multimedia device 110 may receive services from and may communicate with an upstream wide area network (WAN) 140 through a connection to a provider network 150. It should be understood that the multimedia device 110 may operate as an access point to wirelessly deliver multimedia content to one or more client devices 120 that are associated with the multimedia device 110 as stations.

In embodiments, a multimedia device 110 may communicate with a client device 120 over a wired or a wireless connection. The multimedia device 110 may provide one or more channels or service sets through which services and communications may be delivered wirelessly to one or more client devices 120. A client device 120 may associate and authenticate with a multimedia device 110 or associated access point (e.g., wireless router, network extender, etc.), after which communications and services may be delivered from the multimedia device 110 to the client device 120. It should be understood that various protocols and/or standards (e.g., Wi-Fi, multimedia over coax alliance (MoCA), ZigBee, etc.) may be used to deliver communications between a multimedia device 110 and client device 120.

A multimedia device 110 may output live or linear content to a client device 120 as the content is received at the multimedia device 110, or the multimedia device 110 may store content and output the stored content to a client device 120 at a later time. For example, content may be transcoded and stored at the multimedia device 110, wherein the content is conditioned or transcoded into a format that is compatible with one or more client devices 120. In embodiments, the multimedia device 110 may be configured to record and store one or more programs for later viewing by a user. For example, the multimedia device 110 may autonomously, or in response to a user request, record and store content received at the multimedia device 110 within local or remote storage (e.g., DVR).

In embodiments, trickplay controls (i.e., record, stop, fast-forward, reverse, etc.) associated with a multimedia device 110 or other display device (e.g., client device 120) may be used to initiate and/or manipulate playback of linear content or recorded content that is output from the multimedia device 110.

In embodiments, a multimedia device 110 may be configured to record and store individual segments of content received at the multimedia device 110 in response to a request received from a user. When setting up a recording of content, during a recording of content, or subsequent to the completion of content recording, a user may request that only scenes of the content of a specified scene type (e.g., 'action,' 'romance,' 'comedy,' etc.) are recorded and stored at the multimedia device 110. In the alternative, the user may request that the entirety of the piece of content be recorded and stored at the multimedia device 110, and that scenes of the content of a specified scene type be stored separate from the rest of the content as individual or aggregated segments of the piece of content. For example, the multimedia device 110 may provide a user interface to a user that allows the user to enter or select one or more specific scene types for targeting.

When a specified scene type is selected for the recording of a piece of content, the multimedia device 110 may identify scenes or segments of the content (e.g., portions of the content between scene boundaries) that match the specified scene type. In embodiments, the multimedia device 110 may identify scene boundaries within the piece of content. It will be appreciated by those skilled in the relevant art that various scene change detection hardware and/or algorithms may be used to identify a scene change. A scene change detection algorithm may enable hardware scene change detection when the content is being played or recorded. The multimedia device 110 may then determine a scene type associated with each scene of the piece of content. For example, metadata including an identification of a scene type associated with a scene and other information associated with the scene may be carried within the content. The metadata may be identified at the beginning of the content and/or at the beginning of each scene of the content. Scene metadata may include a starting frame offset of each scene along with the duration and type of each scene.

It will be appreciated by those skilled in the relevant art that various techniques may be used to enable hardware scene change detection when a piece of content is being recorded, transcoded or played. For content that is being recorded as it is also being played, a firmware implementation can create scene meta-data that may assist in the identification of scene transition points. For content that is only recorded and not played at the time of recording, a firmware implementation can create scene meta-data at a later stage, for example when the recorded content is played for the first time or when getting transcoded. The scene meta-data created on a per content basis may contain a starting frame offset for each scene along with the duration of the scene. Thereby, the scene meta-data may aide in fetching to necessary offsets within the content when the previewed content is being fetched by a companion device.

As an example, a user may request that the multimedia device 110 only capture scenes of a specified type (say 'action' scenes) from a piece of content. The multimedia device 110 may provide the user with recording options enabling the user to specify that only the scenes of the specified type are to be recorded when the piece of content is received by the multimedia device 110. In response, the multimedia device 110 will begin identifying and recording only those scenes of the specified type as the piece of content is received at the multimedia device 110.

In embodiments, the multimedia device 110 may be configured to list each of one or more scene types available within an available piece of content (e.g., content stored at the multimedia device 110 or other device), thereby allowing a user to view scene(s) of interest from a piece of content. As an example, the multimedia device 110 may determine that a recorded piece of content has five (5) 'action' scenes and five (5) 'drama' scenes. A user interface may include a list of available content, and when a user selects or highlights a specific piece of content, the multimedia device 110 may update the user interface to display the scene types that are found within the specific piece of content. The user may then select one or more specific scene types to start playback. For example, the user may request that the multimedia device 110 only playback scenes of a specified type that are associated with the selected piece of content. In response to the user request, the multimedia device 110 may then start with an offset of the user selected scene type(s) and continue to play only scenes of the user selected scene type one after the other. The multimedia device 110 may be configured to allow the user to perform a next operation to browse or skip to a next available selected scene type (e.g., next 'action' scene) within the content.

In embodiments, a multimedia device 110 may receive a user request for an output of a display showing the available pieces of content and/or each individual scene within the one or more pieces of content that are associated with a specific scene type. In response to the user request, the multimedia device 110 may generate and output a user interface that includes an identification of each piece of content having one or more scenes matching the user-requested scene type and further may include an identification of each individual scene within the piece(s) of content that are associated with the user-requested scene type. For example, when a user wants to watch the 'action' scenes of the content items stored on a device (e.g., content stored on a hard disk), the user can request all or a selected subset of the 'action' scenes from the media library of the multimedia device 110. The multimedia device 110 can respond by listing the available scenes that are of user interest and the user can choose to start playback from a scene of any of the recorded content. Through the displayed user interface, a user may request playback of one or more of the listed scenes matching the scene type query.

It should be understood that the methods, systems, and computer readable media described herein may be extended to existing devices in the field as well as new devices. It should be further understood that selection, recording, and/or playback of individual scenes of a specific type is not limited to only content recorded at a multimedia device 110. Individual scene selection may also be carried out on multimedia content received from external servers (e.g., video-on-demand (VoD) content, etc.).

In embodiments, the multimedia device 110 may be configured to maintain a database or separate file that includes scene information (e.g., location of scene boundaries, scene type identifiers, etc.) of the content items stored in the hard disk of the multimedia device 110. This database or file can be dynamically updated with scene information (e.g., recording item, scene type, scene duration, scene start offset in the hard disk, etc.) while recording a piece of content that includes scene description. The database or file may be accessed and utilized by the multimedia device 110 to search for specified scene types and to aggregate scenes of a specified type for display or playback.

In embodiments, the multimedia device 110 may browse the scene information database or file by parsing the database or file which includes scene information such as recorded item name, scene type, scene duration and scene start offset for each of the recorded items in the hard disk. This list may be parsed by the multimedia device 110 using a scene type specified by a user, and the multimedia device 110 may compile and list the scenes found in the hard disk having the appropriate scene type naming terminology.

It should be understood that each scene within a piece of content may be characterized based upon a scene type associated with the scene. For example, a content provider may add the scene types (e.g., 'action' scene, 'comedy' scene, 'romance' scene, 'drama' scene, etc.) along with other scene information at the beginning of each scene. Scene metadata created on a per content basis may include the starting frame offset of each scene along with the duration and type of the scene. The scene metadata may be utilized by the multimedia device 110 to record content, initiate playback of content, or jump to a requested type of scene within a piece of content when the request is triggered.

In embodiments, a tag may be included within each scene, the tag identifying a scene type associated with the scene. In embodiments, a table or manifest may be included within the stream of a piece of content, the table or manifest identifying scene information associated with the piece of content (e.g., locations of scene boundaries, scene type for each scene, scene length, etc.). It will be appreciated by those skilled in the relevant art that scene information may be retrieved by or communicated to the multimedia device 110 using various other techniques.

In embodiments, the multimedia device 110 may logically offer portions of scenes as content in a directory which can be synced to one or more client devices 120. For example, the directory may be implemented as a standard Digital Living Network Alliance (DLNA) content directory service (CDS) entry.

Figure 2:
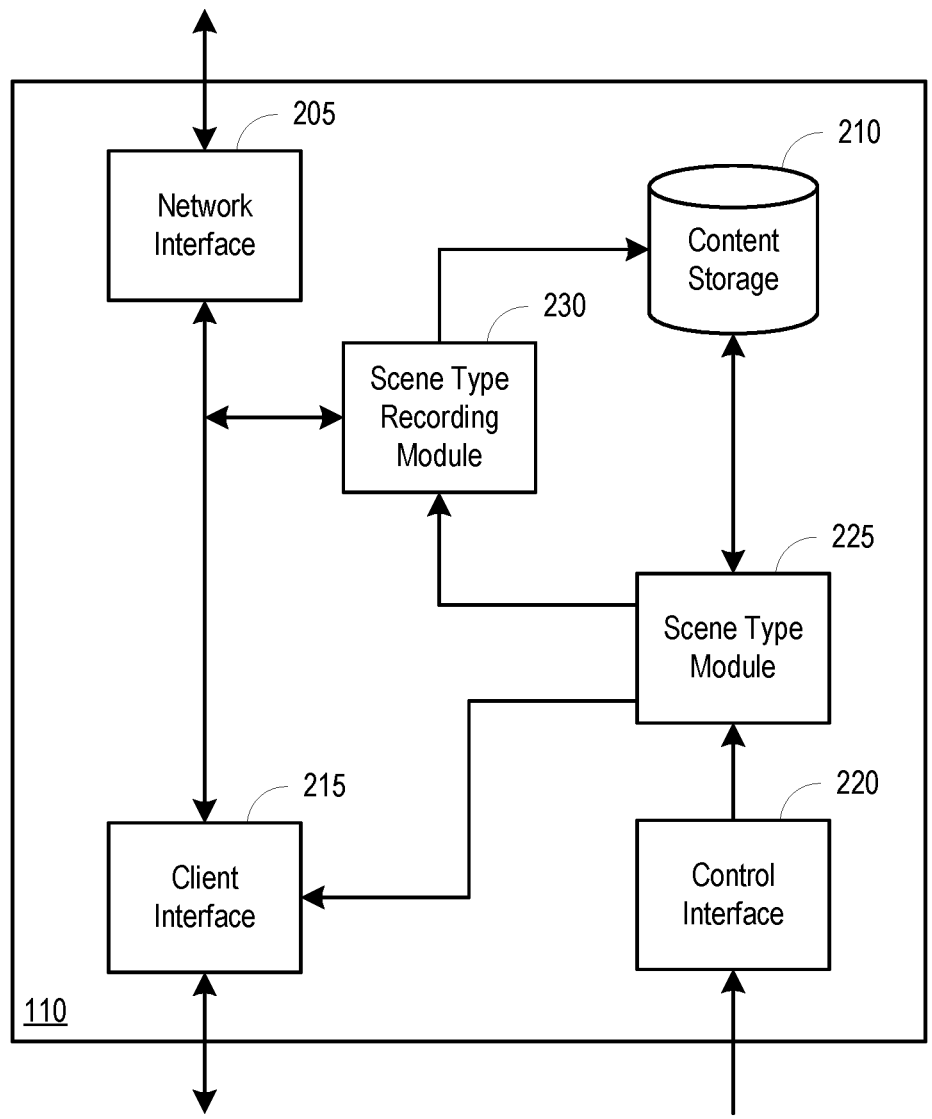
FIG. 2 is a block diagram illustrating an example multimedia device operable to facilitate the user control of content based on scene change detection and metadata.

FIG. 2 is a block diagram illustrating an example multimedia device 110 operable to facilitate the user control of content based on scene change detection and metadata. The multimedia device 110 may include a network interface 205, content storage 210, a client interface 215, a control interface 220, a scene type module 225, and a scene type recording module 230. The multimedia device 110 may include a multimedia or residential gateway, a set-top box (STB), or any other device configured to receive, store, and/or deliver multimedia content to one or more client devices 120 of FIG. 1.

In embodiments, the multimedia device 110 may communicate with one or more client devices 120 over a wired or a wireless connection through the client interface 215. The multimedia device 110 may output content and/or other services to client devices 120 through the client interface 215 and may receive requests for content and/or other upstream communications through the client interface 215. It should be understood that the client interface 215 may include various wired and/or wireless interfaces using various protocols and/or standards (e.g., Wi-Fi, multimedia over coax alliance (MoCA), ZigBee, Ethernet, etc.) that may be used to deliver communications between a multimedia device 110 and client device(s) 120. For example, the multimedia device 110 may communicate with one or more client devices 120 over a local network 130 of FIG. 1.

In embodiments, content may be received at the multimedia device 110 from an upstream network (e.g., provider network 150 of FIG. 1, WAN 140 of FIG. 1, etc.) through the network interface 205. Communications and services received through the network interface 205 may be forwarded to one or more client devices 120 through the client interface 215. For example, content streams (e.g., live or linear content, VoD content, recorded content, etc.) may be recorded by the multimedia device 110 and stored at content storage 210, and/or the content streams may be forwarded to one or more client devices 120 through the client interface 215. The multimedia device 110 may include one or more live off disk (LOD) buffers (e.g., at content storage 210), and content streams received at the multimedia device 110 may be temporarily stored or buffered within the LOD buffer(s).

In embodiments, the output of content (e.g., both recorded and linear content) may be controlled by user requests received from a control device (e.g., RCU) through the control interface 220. For example, a user may view available content through a menu displayed at a display device, and may select content for delivery from the multimedia device 110 to a client device 120. The user may control playback and recording functions at the multimedia device 110 using various buttons at a control device (e.g., record, play, fast-forward, rewind, skip, and other trickplay controls).

In embodiments, the scene type module may generate and output a user interface that provides a user with recording options enabling the user to specify that only the scenes of a specified type are to be recorded when a piece of content is received by the multimedia device 110. For example, the user may specify (e.g., through a command received via the control interface 220) a scene type for the recording of individual scenes of a piece of content. The scene type recording module 230 may be configured to identify scenes or segments of the content (e.g., portions of the content between scene boundaries) that match the specified scene type. The scene type recording module 230 may then determine a scene type associated with each scene of a received piece of content. For example, metadata including an identification of a scene type associated with a scene and other information associated with the scene may be carried within the content. The metadata may be identified by the scene type recording module 230 at the beginning of the content and/or at the beginning of each scene of the content. Scene metadata may include a starting frame offset of each scene along with the duration and type of each scene. The scene type recording module 230 may record and store at the content storage 210 only those scenes of the received piece of content that match the specified scene type.

In embodiments, the scene type module 225 may be configured to compile and output a list of each of one or more scene types available within an available piece of content (e.g., content stored at the content storage 210 or other device), thereby allowing a user to view scene(s) of interest from a piece of content. A user interface generated and output through the client interface 215 by the scene type module 225 may include a list of available content, and when a user selects or highlights a specific piece of content, the scene type module 225 may update the user interface to display the scene types that are found within the specific piece of content. The user may then select one or more specific scene types to start playback. In response to the user request, the scene type module 225 may initiate playback of the selected piece of content from a first scene of the content that matches the specified scene type, and the scene type module 225 may continue to play only those scenes of the user selected scene type one after the other.

In embodiments, the scene type module 225 may respond to a user request for an output of a display showing the available pieces of content and/or each individual scene within the one or more pieces of content that are associated with a specific scene type. For example, the scene type module 225 may generate and output a user interface that includes an identification of each piece of content having one or more scenes matching the user-requested scene type and further may include an identification of each individual scene within the piece(s) of content that are associated with the user-requested scene type. Through the displayed user interface, a user may request playback of one or more of the listed scenes matching the scene type query, and the scene type module 225 may respond by initiating playback of the selected one or more scenes.

In embodiments, the scene type module 225 may browse scene information stored at the content storage 210 by parsing the database or file which includes scene information such as recorded item name, scene type, scene duration and scene start offset for each of the recorded items in the content storage 210. This list may be parsed by the scene type module 225 using a scene type specified by a user, and the scene type module 225 may compile and list the scenes found in the content storage 210 having the appropriate scene type naming terminology.

Figure 3:
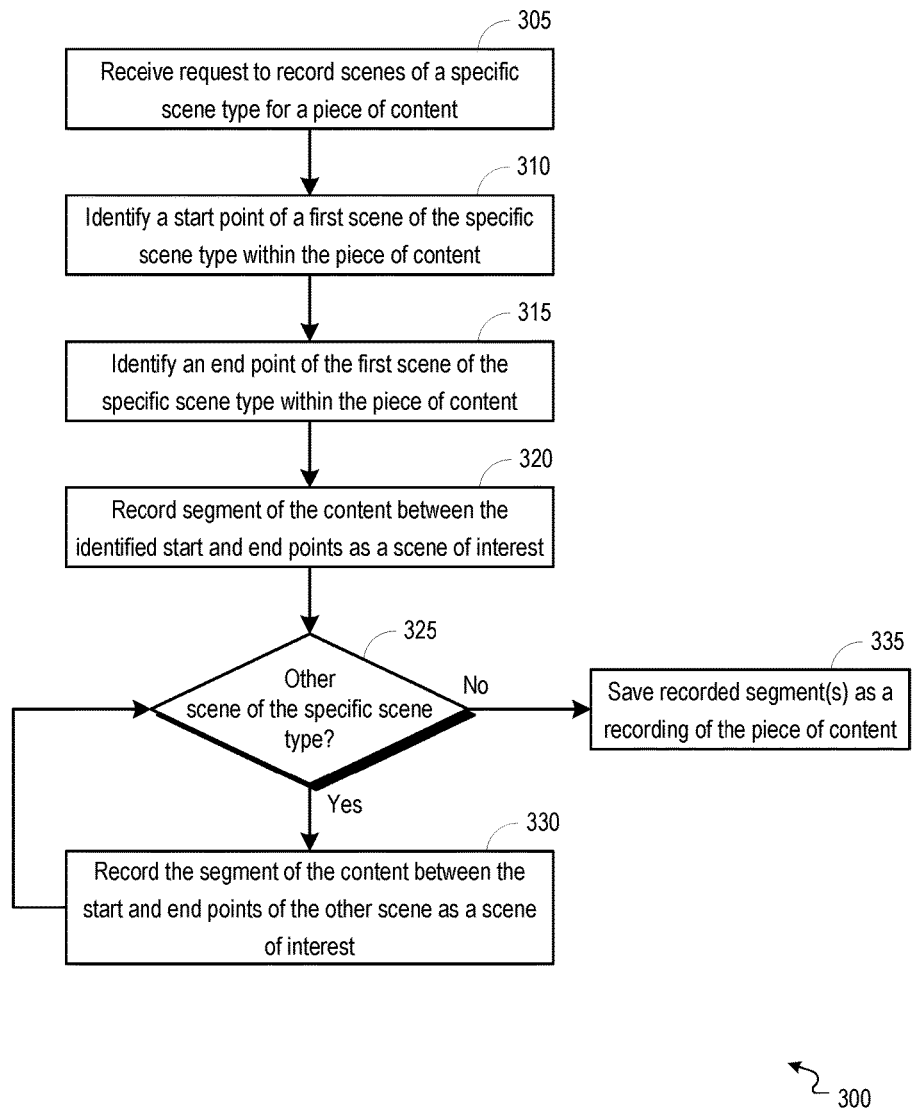
FIG. 3 is a flowchart illustrating an example process operable to facilitate the recording of segments of content that are associated with a specified scene type.

FIG. 3 is a flowchart illustrating an example process 300 operable to facilitate the recording of segments of content that are associated with a specified scene type. The process 300 may begin at 305 when a request to record scenes of a specific scene type for a piece of content is received. The request may be received, for example, at a multimedia device 110 of FIG. 1. The request may specify a scene type (e.g., 'action,' 'comedy,' 'romance,' etc.) for recording individual scenes of a piece of content received at the multimedia device 110.

At 310, a start point of a first scene of the specific scene type within the piece of content may be identified. The start point may be identified, for example, by the scene type recording module 230 of FIG. 2. In embodiments, the scene type recording module 230 may retrieve scene type metadata from the received piece of content or associated signal, and the metadata may include scene type information such as a scene type category, an initial offset of the associated scene, a duration of the scene, a start point of the scene, an ending/termination point of the scene, and others. The scene type recording module 230 may use the metadata to identify a first scene of the content that matches the specified scene type as well as a start point of the identified first scene.

At 315, an end point of the first scene of the specific scene type within the piece of content may be identified. The end point may be identified, for example, by the scene type recording module 230 of FIG. 2. In embodiments, the scene type recording module 230 may use the metadata recovered from the content to identify the end point of the identified first scene.

At 320, the segment of the content between the identified start and end points may be recorded as a scene of interest. The segment of the content may be recorded, for example, by the scene type recording module 230 of FIG. 2 and may be stored as a scene of interest, for example, at the content storage 210 of FIG. 2. It should be understood that the scene type recording module 230 may refrain from recording other segments of the content, may begin recording the content when the identified start point is reached, and may terminate the recording of the content when the identified end point is reached.

At 325, a determination may be made whether there is at least one other scene of the specific scene type within the piece of content. The determination whether at least one other scene of the specific scene type is within the piece of content may be made, for example, by the scene type recording module 230 of FIG. 2. In embodiments, the scene type recording module 230 check scene type metadata recovered from the received content to determine whether any other scenes of the specific scene type are within the content. Metadata identifying all scenes and associated scene types may be consulted by the scene type recording module 230, or metadata may be recovered on a per scene basis.

If, at 325, the determination is made that there is at least one other scene of the specific scene type within the piece of content, the process 300 may proceed to 330. At 330, the segment of the content between the start and end points of the next scene of the specified scene type may be recorded as a scene of interest. The segment of the next scene of the specified scene type may be recorded, for example, by the scene type recording module 230 of FIG. 2 according to the previously described steps 310-320.

If, at 325, the determination is made that there is not at least one other scene of the specific scene type within the piece of content, the process 300 may proceed to 335. At 335, the one or more segments recorded as scenes of interest may be saved as one or more recordings of the piece of content. The segment(s) may be saved, for example, by the scene type recording module 230 of FIG. 2 at content storage 210 of FIG. 2. In embodiments, the segment(s) may be aggregated and saved as a single recording associated with the piece of content, or each of the one or more segments may be saved individually as individual scenes of the piece of content.

Figure 4:
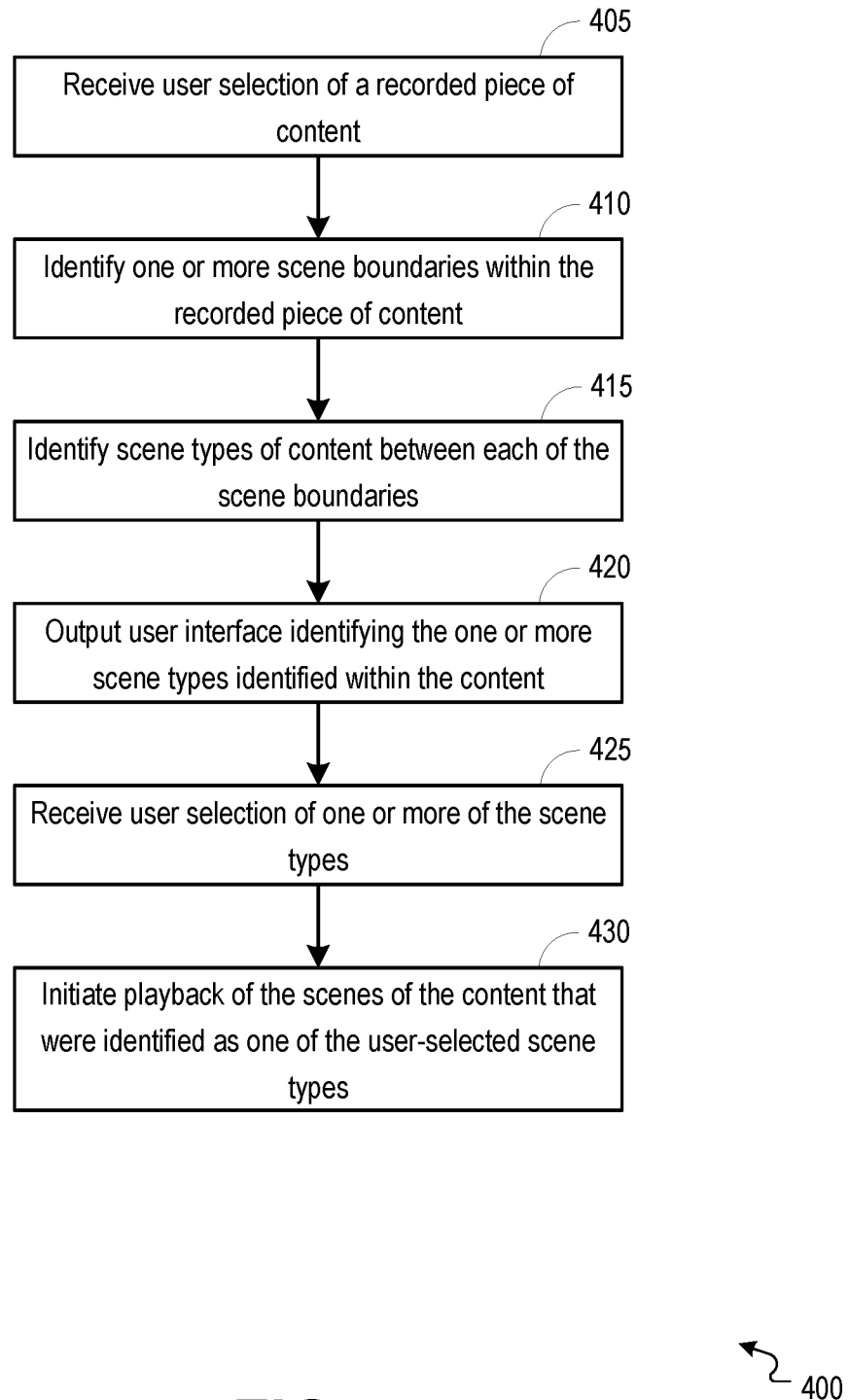
FIG. 4 is a flowchart illustrating an example process operable to facilitate the generation and navigation of a user interface displaying available scene types of a piece of content.

FIG. 4 is a flowchart illustrating an example process 400 operable to facilitate the generation and navigation of a user interface displaying available scene types of a piece of content. The process 400 may begin at 405 when a user selection of a recorded piece of content is received. The request may be received, for example, by a multimedia device 110 of FIG. 1. In embodiments, the user may select the content from a user interface (e.g., a list or guide) including a plurality of pieces of content available to the user.

At 410, one or more scene boundaries within the recorded piece of content may be identified. The one or more scene boundaries may be identified, for example, by the scene type module 225 of FIG. 2. In embodiments, the scene type module 225 may identify the selected piece of content from the content storage 210 of FIG. 2 and scene boundary information associated with the content. The scene boundary information may be retrieved by the scene type module 225 from metadata included in the content or from a separate file or database stored at the content storage 210 or other storage medium. The scene boundary information may identify one or more points within the content delineating scenes of the content from each other. The scene type module 225 may identify each segment of content between scene boundaries as separate scenes of the content.

At 415, scene types of each of the identified scenes of the content may be identified. The scene types may be identified, for example, by the scene type module 225 of FIG. 2. In embodiments, the scene type module 225 may identify a scene type associated with a scene from associated scene boundary information. The scene boundary information may be retrieved by the scene type module 225 from metadata included in the content or from a separate file or database stored at the content storage 210 of FIG. 2 or other storage medium.

At 420, a user interface identifying the one or more scene types identified within the content may be output. The user interface may be generated, for example, by the scene type module 225 of FIG. 2 and may be output to a display device associated with the multimedia device 110 of FIG. 2 or other device (e.g., client device 120 of FIG. 1). In embodiments, the scene type module 225 may retrieve information associated with the scenes of a piece of content from content storage 210 of FIG. 2, and the scene type module 225 may consolidate the retrieved information into a table or guide displayed as a user interface. The user interface may list one or more pieces of available content and may show the types of scenes found within a selected piece of content. It should be understood that the user interface may include other information associated with the individual scenes making up the piece of content. An example of the user interface generated by the scene type module 225 is shown in FIG. 5.

At 425, a user selection of one or more of the scene types associated with a piece of content may be received. The scene type selection may be made by a user selecting a scene type associated with a piece of content listed in a user interface generated and output by the scene type module 225 of FIG. 2.

At 430, playback of one or more scenes of the content that were identified as one of the user-selected scene types may be initiated. Playback of the one or more scenes may be initiated, for example, by the scene type module 225 of FIG. 2. In embodiments, the scene type module 225 may initiate a playback of only those scenes of the piece of content matching one of the user-selected scene types. It will be appreciated by those skilled in the relevant art that various methods may be used for outputting the selected portions of the content to a display device. For example, the scene type module 225 may retrieve and output each scene individually, or the scene type module 225 may create a playlist including each scene matching a selected scene type.

Figure 5:
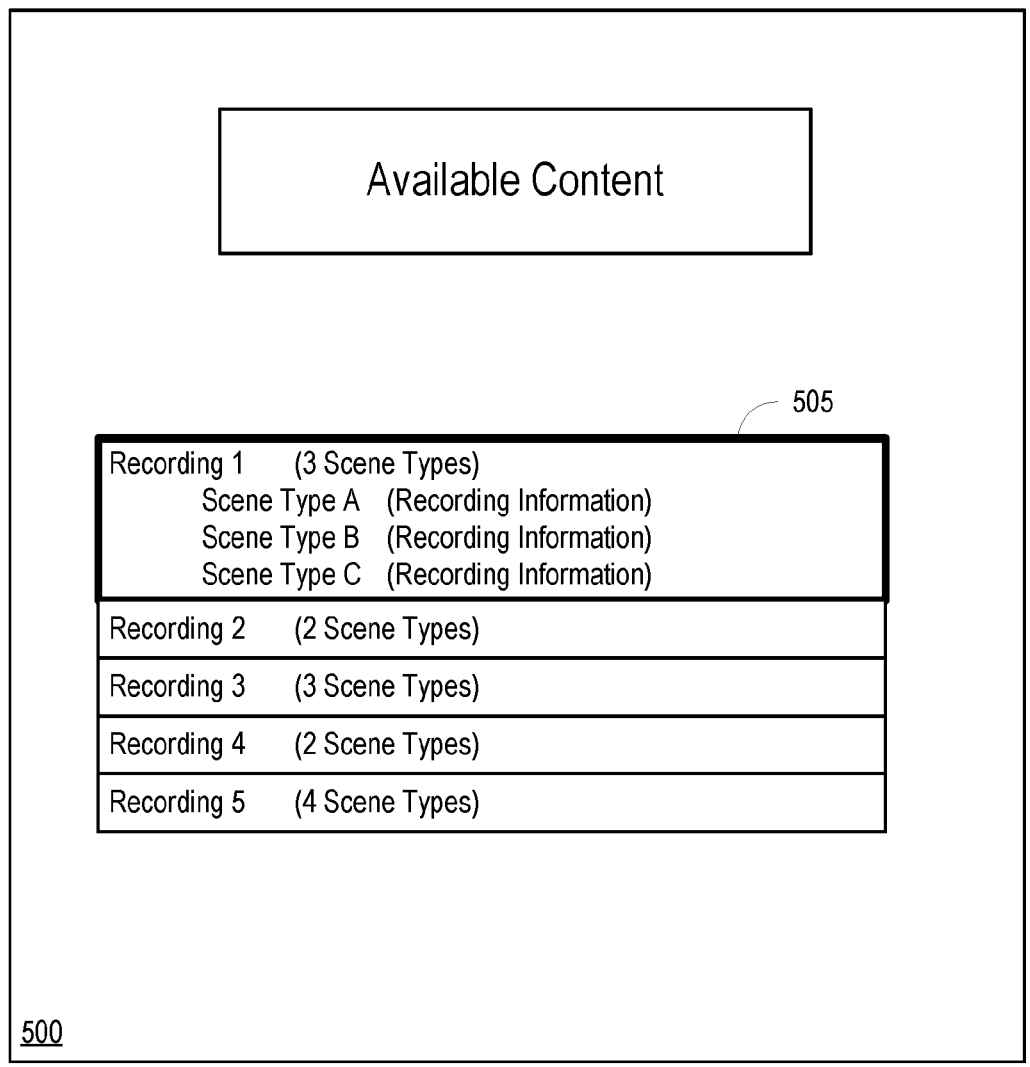
FIG. 5 is an illustration of an example interface including a display identifying one or more scene types of a selected piece of content.

FIG. 5 is an illustration of an example interface 500 including a display 505 identifying one or more scene types of a selected piece of content. The interface 500 may be output to a display device from a multimedia device 110 of FIG. 1 (e.g., by a scene type module 225 of FIG. 2). In embodiments, the display 505 may include a plurality of titles (e.g., 'Recording 1,' 'Recording 2,' 'Recording 5'), each title identifying a recording available for playback. The recordings may include recordings stored at a multimedia device 110 of FIG. 1, recordings stored at another storage device, or linear content received at a multimedia device 110. Each recording entry may further include an identification of the number of different scene types that are found within the corresponding recording.

When a recording or recording title is selected for playback or closer inspection (e.g., as is 'Recording 1'), identifiers of one or more scene types (e.g., 'Scene Type A,' 'Scene Type B,' 'Scene Type C,' etc.) associated with the selected recording may be displayed within the display 505. For example, the scene type identifiers may be displayed within a display window or box associated with the selected recording. Additional information (e.g., 'Recording Information') associated with a scene type may be displayed along with the scene type identifier. For example, additional information associated with a scene type may include a number of different scenes of the corresponding scene type that are present within the selected recording, a total duration of the scene(s) of the scene type within the selected recording, and others.

In embodiments, a user may navigate the display 505 and select one or more scene types of a selected recording from the display 505 for playback at a display device (e.g., display connected to a multimedia device 110 of FIG. 1 or client device 120 of FIG. 1 associated with a multimedia device 110). The user may select a single scene of a scene type for playback or may select a plurality of scenes of a scene type for playback. For example, a user may choose an option to have all, or a selected plurality, of the scenes of a scene type delivered to a device for playback.

Figure 6:
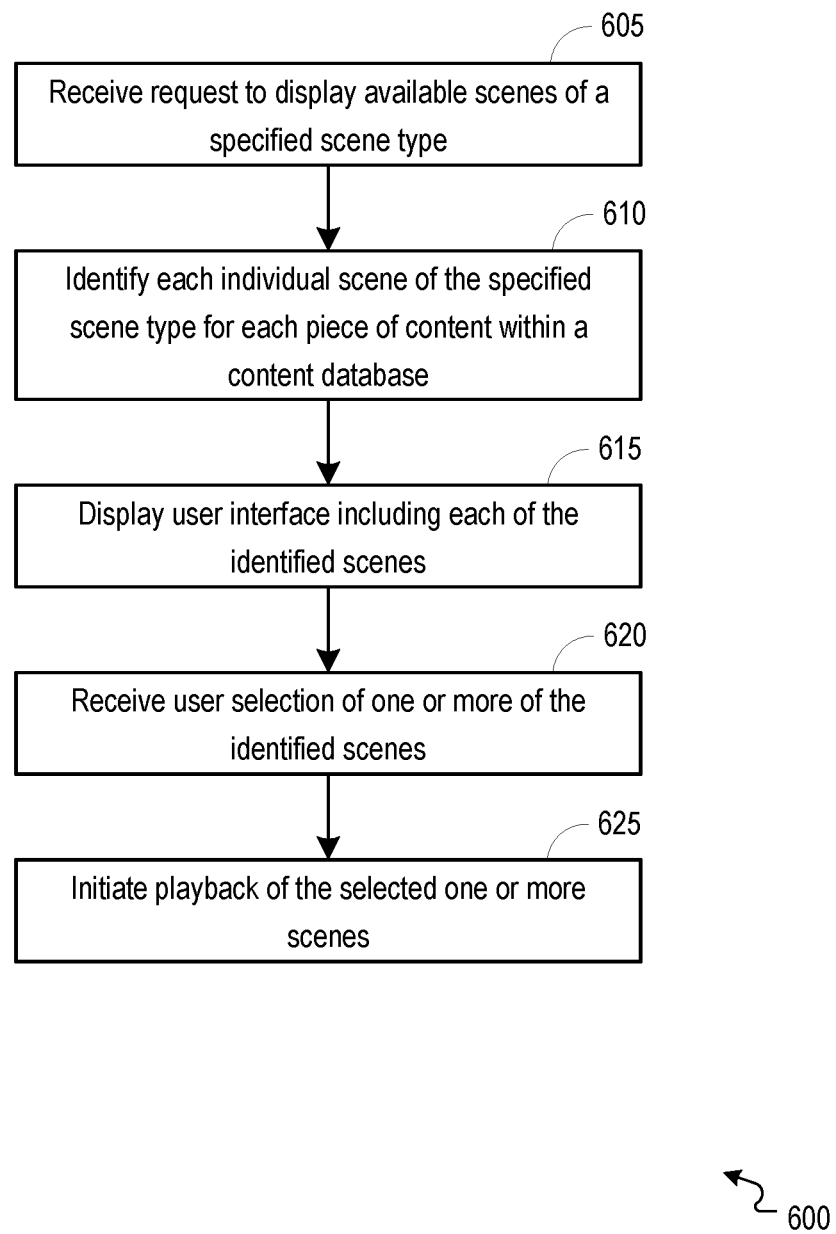
FIG. 6 is a flowchart illustrating an example process operable to facilitate the generation and navigation of a user interface displaying available scene types of available content.

FIG. 6 is a flowchart illustrating an example process 600 operable to facilitate the generation and navigation of a user interface displaying available scene types of available content. The process 600 may begin at 605 when a request for a display of available scenes of a specified scene type is received. The request may be received from a device (e.g., client device 120 of FIG. 1) at a multimedia device 110 of FIG. 1. The request may be for an identification of scenes of the specified scene type that are available from recorded multimedia content stored at the multimedia device 110 (e.g., content storage 210 of FIG. 2).

At 610, each individual scene of the specified scene type may be identified for each piece of content within a content database. The individual scenes may be identified, for example, by the scene type module 225 of FIG. 2. In embodiments, the individual scenes may be stored within content storage 210 of FIG. 2 and may include information identifying an association with an original piece of content and a scene type (e.g., metadata, naming convention, or other information may serve as an indication of a partial recording's association with an original piece of content and a scene type). The scene type module 225 may search for and identify one or more individual scenes of one or more pieces of content that are stored within the content storage 210, wherein the one or more scenes are identified as being of the specified scene type.

At 615, a user interface including identifiers of each of the identified scenes may be displayed. The user interface may be output, for example, by the scene type module 225 of FIG. 2 to a display device (e.g., client device 120 of FIG. 1). In embodiments, the one or more identifiers may include text identifying a piece of content of which the scene is a part, and may include other information associated with the scene (e.g., duration of the scene, relative location of the scene within the piece of content, and others). The one or more identifiers may be displayed within a menu or guide interface. In embodiments, the displayed identifiers may include only those identifiers associated with scenes determined to be of the specified scene type. An example user interface that may be generated by the scene type module 225 is shown in FIG. 7.

At 620, a user selection of one or more of the identified scenes may be received. A user may select one or more of the identified scenes for playback, and the user selection may be received at the multimedia device 110 of FIG. 1 and may be detected by the scene type module 225 of FIG. 2. In embodiments, a user may select one or more identified scenes from one or more scene identifiers displayed within a menu or guide that is presented to the user.

At 625, playback of the selected one or more scenes may be initiated. Playback of the selected one or more scenes may be initiated, for example, by the scene type module 225, and the scene(s) may be output from a multimedia device 110 to a requesting client device 120. In embodiments, the scene type module 225 may output a single, a plurality, or the entirety of the available scenes that are associated with the specified scene type. It should be understood that the output scenes may be from different pieces of content.

Figure 7:
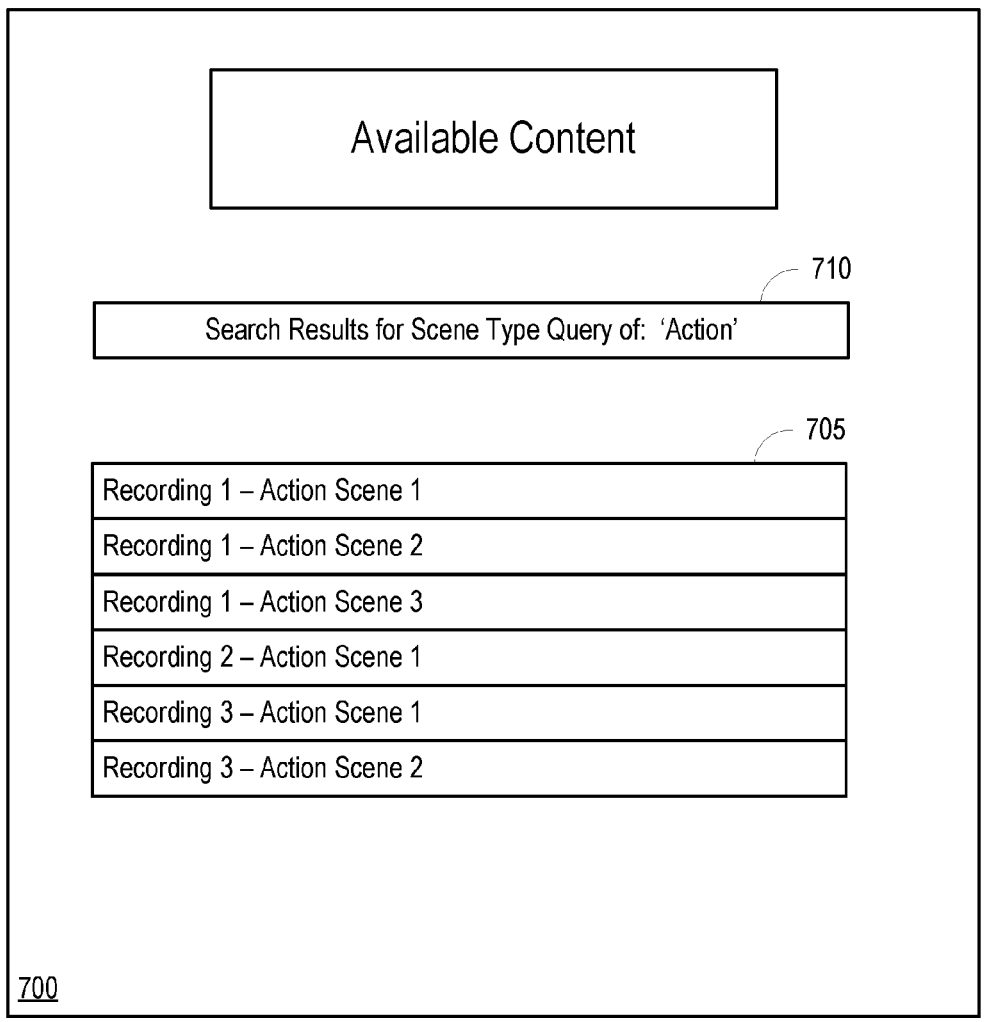
FIG. 7 is an illustration of an example interface including a display identifying one or more scenes of one or more pieces of content that are associated with a specified scene type.

FIG. 7 is an illustration of an example interface 700 including a display 705 identifying one or more scenes of one or more pieces of content that are associated with a specified scene type. In embodiments, the display 705 may include a plurality of titles identifying a piece of content (i.e., recording) with which an individual scene is associated. The recordings may include recordings stored at a multimedia device 110 of FIG. 1, recordings stored at another storage device, or linear content received at a multimedia device 110. The identifier of each scene may identify a relative position of the scene within the associated content. For example, each scene may be numbered according to a position relative to other scenes of like scene types within the content (e.g., 'Action Scenes 1-3' of 'Recording 1'). Each scene listing may include other information associated with the scene (e.g., start point, termination point, duration of scene, etc.).

In embodiments, a window 710 may indicate the type of scene with which the listed scenes are associated. The window 710 may include a text bar within which a user may enter a query for a specific scene type ('Action'). A multimedia device 110 of FIG. 1 from which the interface 700 is output may respond to an entry of a search term in the window 710 by searching for, identifying, and including within an updated display 705, one or more scene identifiers associated with the scene type specified by the search term.

In embodiments, a user may select one or more of the scenes from the display 705 for playback at a display device (e.g., display connected to a multimedia device 110 of FIG. 1 or client device 120 of FIG. 1 associated with a multimedia device 110). The user may select a single scene for playback or may select a plurality or all of the listed scenes for playback.

Figure 8:
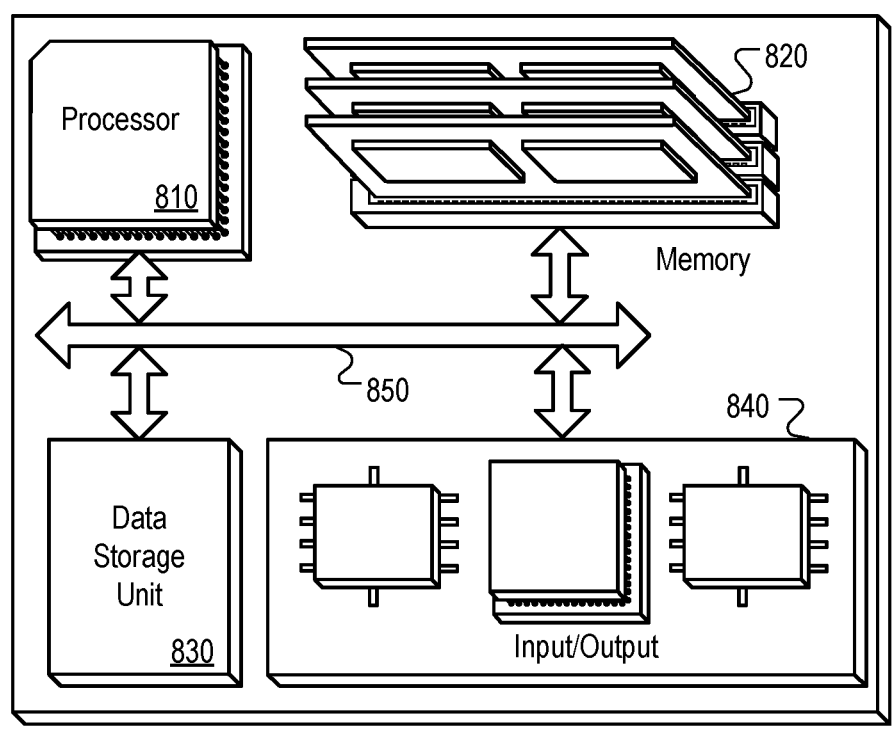
FIG. 8 is a block diagram of a hardware configuration operable to facilitate the user control of content based on scene change detection and metadata.

FIG. 8 is a block diagram of a hardware configuration 800 operable to facilitate the user control of content based on scene change detection and metadata. The hardware configuration 800 can include a processor 810, a memory 820, a storage device 830, and an input/output device 840. Each of the components 810, 820, 830, and 840 can, for example, be interconnected using a system bus 850. The processor 810 can be capable of processing instructions for execution within the hardware configuration 800. In one implementation, the processor 810 can be a single-threaded processor. In another implementation, the processor 810 can be a multi-threaded processor. The processor 810 can be capable of processing instructions stored in the memory 820 or on the storage device 830.

The memory 820 can store information within the hardware configuration 800. In one implementation, the memory 820 can be a computer-readable medium. In one implementation, the memory 820 can be a volatile memory unit. In another implementation, the memory 820 can be a non-volatile memory unit.

In some implementations, the storage device 830 can be capable of providing mass storage for the hardware configuration 800. In one implementation, the storage device 830 can be a computer-readable medium. In various different implementations, the storage device 830 can, for example, include a hard disk device, an optical disk device, flash memory or some other large capacity storage device. In other implementations, the storage device 830 can be a device external to the hardware configuration 800.

The input/output device 840 provides input/output operations for the hardware configuration 800. In one implementation, the input/output device 840 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a central or access device (e.g., multimedia device 110 of FIG. 1 such as an access point, gateway device, STB, DVR or other content storage device, cable modem, router, wireless extender, or other access device) or client device 120 of FIG. 1 (e.g., STB, computer, television, tablet, mobile device, etc.). In another implementation, the input/output device can include driver devices configured to send communications to, and receive communications from one or more networks (e.g., WAN 140 of FIG. 1, local network 130 of FIG. 1, provider network 150 of FIG. 1, etc.).

Those skilled in the art will appreciate that the invention described herein provides methods and systems for giving a user insight into the scene-type makeup of a piece of content. Methods, systems, and computer readable media described herein may facilitate the characterization of content segments based on a type of content, thus providing a user with the flexibility to: record only the scene types of interest to the user; playback only the scene types of interest to the user; search a media library, wherein the results of the search will include a list of only the content having scene types of interest to the user; browse available user selected scenes from clients; reposition content to user interested scene type during playback; and/or generate a detailed listing of the content based on the scene types. Scene change detection and scene type metadata may be used to identify scene boundaries within a piece of content and to characterize a scene based on a scene type.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
receiving a request to record a piece of content, wherein the request identifies a specified scene type for recording, and wherein the request is received by a multimedia device;
retrieving, at the multimedia device, the piece of content;
retrieving scene type information associated with the piece of content, wherein the scene type information identifies a scene type associated with each respective one of one or more segments of the piece of content, each respective segment comprising a start point at a scene boundary and an end point at another scene boundary, wherein the start point and end point are identified through a scene change detection utilized by the multimedia device;
based upon the scene type information associated with the piece of content, identifying one or more segments of the piece of content that are associated with the specified scene type; and
recording and storing the identified one or more segments of the piece of content, wherein the one or more segments of the piece of content are recorded and stored as a recording comprising one or more select segments of the piece of content, the one or more select segments being identified based upon the scene type information associated with the piece of content.

2. The method of claim 1, wherein the scene type information is retrieved from metadata carried within the piece of content.

3. The method of claim 1, wherein the identified one or more segments of the piece of content are the only segments of the piece of content that are recorded.

4. The method of claim 1, further comprising:
wherein the entirety of the piece of content is recorded;
identifying a scene type associated with each of one or more segments of the piece of content, each respective segment comprising a start point at a scene boundary and an end point at another scene boundary;
generating a user interface including an identification of each scene type that is associated with at least one segment of the piece of content; and
outputting the user interface to a display.

5. The method of claim 4, further comprising:
receiving a request for playback of one or more segments associated with a specified scene type; and
initiating playback of the one or more segments that are associated with the specified scene type.

6. The method of claim 1, further comprising:
wherein one or more segments of another piece of content are recorded and stored, the one or more segments being associated with the specified scene type;
receiving a request to display the one or more scenes of the specified scene type for each of the pieces of content recorded and stored;
for each piece of content that is recorded and stored, identifying each segment that is associated with the specified scene type;
generating a user interface including an identification of each of the segments identified from each of the pieces of content; and
outputting the user interface to a display.

7. The method of claim 6, further comprising:
receiving a request for playback of one or more of the segments; and
initiating playback of the one or more segments.

8. An apparatus comprising:
one or more interfaces configured to be used to:
receive a request to record a piece of content, wherein the request identifies a specified scene type for recording; and
retrieve the piece of content; and
a scene type recording module configured to:
retrieve scene type information associated with the piece of content, wherein the scene type information identifies a scene type associated with each respective one of one or more segments of the piece of content, each respective segment comprising a start point at a scene boundary and an end point at another scene boundary, wherein the start point and end point are identified through a scene change detection utilized by the scene type recording module;
based upon the scene type information associated with the piece of content, identify one or more segments of the piece of content that are associated with the specified scene type; and
record and store the identified one or more segments of the piece of content, wherein the one or more segments of the piece of content are recorded and stored as a recording comprising one or more select segments of the piece of content, the one or more select segments being identified based upon the scene type information associated with the piece of content.

9. The apparatus of claim 8, wherein the scene type information is retrieved from metadata carried within the piece of content.

10. The apparatus of claim 8, wherein the identified one or more segments of the piece of content are the only segments of the piece of content that are recorded.

11. The apparatus of claim 8, wherein the entirety of the piece of content is recorded, and wherein the apparatus further comprises:
a scene type module configured to:
identify a scene type associated with each of one or more segments of the piece of content, each respective segment comprising a start point at a scene boundary and an end point at another scene boundary; and
generate a user interface including an identification of each scene type that is associated with at least one segment of the piece of content; and
wherein the one or more interfaces are further configured to be used to output the user interface to a display.

12. The apparatus of claim 11, wherein the one or more interfaces are further configured to be used to receive a request for playback of one or more segments associated with a specified scene type, and wherein the scene type module is further configured to initiate playback of the one or more segments that are associated with the specified scene type.

13. The apparatus of claim 8, wherein one or more segments of another piece of content are recorded and stored, the one or more segments being associated with the specified scene type, wherein the one or more interfaces are further configured to be used to receive a request to display the one or more scenes of the specified scene type for each of the pieces of content recorded and stored, and wherein the apparatus further comprises:
a scene type module configured to:
for each piece of content that is recorded and stored, identify each segment that is associated with the specified scene type; and
generate a user interface including an identification of each of the segments identified from each of the pieces of content; and
wherein the one or more interfaces are further configured to be used to output the user interface to a display.

14. One or more non-transitory computer readable media having instructions operable to cause one or more processors to perform the operations comprising:
receiving a request to record a piece of content, wherein the request identifies a specified scene type for recording, and wherein the request is received by a multimedia device;
retrieving, at the multimedia device, the piece of content;
retrieving scene type information associated with the piece of content, wherein the scene type information identifies a scene type associated with each respective one of one or more segments of the piece of content, each respective segment comprising a start point at a scene boundary and an end point at another scene boundary, wherein the start point and end point are identified through a scene change detection utilized by the multimedia device;
based upon the scene type information associated with the piece of content, identifying one or more segments of the piece of content that are associated with the specified scene type; and
recording and storing the identified one or more segments of the piece of content, wherein the one or more segments of the piece of content are recorded and stored as a recording comprising one or more select segments of the piece of content, the one or more select segments being identified based upon the scene type information associated with the piece of content.

15. The one or more non-transitory computer-readable media of claim 14, wherein the scene type information is retrieved from metadata carried within the piece of content.

16. The one or more non-transitory computer-readable media of claim 14, wherein the identified one or more segments of the piece of content are the only segments of the piece of content that are recorded.

17. The one or more non-transitory computer-readable media of claim 14, wherein the instructions are further operable to cause one or more processors to perform the operations comprising:
wherein the entirety of the piece of content is recorded;
identifying a scene type associated with each of one or more segments of the piece of content, each respective segment comprising a start point at a scene boundary and an end point at another scene boundary;
generating a user interface including an identification of each scene type that is associated with at least one segment of the piece of content; and
outputting the user interface to a display.

18. The one or more non-transitory computer-readable media of claim 17, wherein the instructions are further operable to cause one or more processors to perform the operations comprising:
receiving a request for playback of one or more segments associated with a specified scene type; and
initiating playback of the one or more segments that are associated with the specified scene type.

19. The one or more non-transitory computer-readable media of claim 14, wherein the instructions are further operable to cause one or more processors to perform the operations comprising:
wherein one or more segments of another piece of content are recorded and stored, the one or more segments being associated with the specified scene type;
receiving a request to display the one or more scenes of the specified scene type for each of the pieces of content recorded and stored;
for each piece of content that is recorded and stored, identifying each segment that is associated with the specified scene type;
generating a user interface including an identification of each of the segments identified from each of the pieces of content; and
outputting the user interface to a display.

20. The one or more non-transitory computer-readable media of claim 19, wherein the instructions are further operable to cause one or more processors to perform the operations comprising:
receiving a request for playback of one or more of the segments; and
initiating playback of the one or more segments.

* * * * *